US010196802B2

(12) United States Patent
Park et al.

(10) Patent No.: US 10,196,802 B2
(45) Date of Patent: Feb. 5, 2019

(54) FOOD WASTE TREATMENT APPARATUS

(71) Applicant: LG ELECTRONICS INC., Seoul (KR)

(72) Inventors: Daeyun Park, Seoul (KR); Jeongyun Kim, Seoul (KR); Sunki Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 736 days.

(21) Appl. No.: 14/753,252

(22) Filed: Jun. 29, 2015

(65) Prior Publication Data

US 2015/0376882 A1 Dec. 31, 2015

(30) Foreign Application Priority Data

Jun. 30, 2014 (KR) ........................ 10-2014-0080616

(51) Int. Cl.
*B02C 23/20* (2006.01)
*B02C 25/00* (2006.01)
(Continued)

(52) U.S. Cl.
CPC ........ *E03C 1/2665* (2013.01); *B02C 18/0092* (2013.01); *B02C 18/2216* (2013.01);
(Continued)

(58) Field of Classification Search
CPC ............... E03C 1/2665; B26B 11/0431; B02C 18/0092; B02C 23/20; B02C 25/00;
(Continued)

(56) References Cited

U.S. PATENT DOCUMENTS 5,129,590 A * 7/1992 Shinya .................... B30B 9/128 100/117
5,249,749 A 10/1993 Krebsbach
(Continued)

FOREIGN PATENT DOCUMENTS

CN 101050640 10/2007
DE 202013003953 7/2013
(Continued)

OTHER PUBLICATIONS

Extended European Search Report issued in European Application No. 15173817.6 dated Jan. 5, 2016, 7 pages.
(Continued)

*Primary Examiner* — Shelley Self
*Assistant Examiner* — Smith O Bapthelus
(74) *Attorney, Agent, or Firm* — Fish & Richardson P.C.

(57) ABSTRACT

A control method of a food waste treatment apparatus is disclosed. The method includes the action of connecting a discharge side of a grinder with a communication hole of a dehydrator. The method further includes the action of receiving the food waste. The method further includes the action of grinding the food waste. The method further includes the action of receiving the ground food waste. The method further includes the action of supplying a predetermined amount of wash water to a housing that includes the dehydrator. The method further includes the action of rinsing the ground food waste. The method further includes the action of discharging wash water. The method further includes the action of drying the ground food waste. The method further includes the action of discharging the dried ground food waste.

14 Claims, 15 Drawing Sheets

(51) Int. Cl.

| | |
|---|---|
| ***B07B 1/18*** | (2006.01) |
| ***B07B 1/24*** | (2006.01) |
| ***B08B 9/093*** | (2006.01) |
| ***B09B 3/00*** | (2006.01) |
| ***F26B 21/08*** | (2006.01) |
| ***E03C 1/266*** | (2006.01) |
| ***B02C 18/00*** | (2006.01) |
| ***B02C 18/22*** | (2006.01) |
| ***F26B 11/04*** | (2006.01) |
| ***F26B 21/10*** | (2006.01) |
| ***F26B 21/12*** | (2006.01) |

(52) U.S. Cl.
CPC .............. *B02C 23/20* (2013.01); *B02C 25/00* (2013.01); *B07B 1/18* (2013.01); *B07B 1/24* (2013.01); *B08B 9/093* (2013.01); *B09B 3/00* (2013.01); *F26B 11/0431* (2013.01); *F26B 11/0445* (2013.01); *F26B 21/08* (2013.01); *F26B 21/10* (2013.01); *F26B 21/12* (2013.01); *F26B 2200/18* (2013.01)

(58) Field of Classification Search
CPC ......... B02C 18/2216; B07B 1/24; B07B 1/28; B07B 1/18; B08B 9/093; B08B 9/08; F26B 2200/18; F26B 2200/00; F26B 11/0431; F26B 11/0445; F26B 21/08; F26B 21/10; F26B 21/12; B09B 3/00
USPC ............................. 241/23, 65, 46.013, 101.3
See application file for complete search history.

(56) References Cited

U.S. PATENT DOCUMENTS

| | | | | |
|---|---|---|---|---|
| 6,613,223 | B2 | 9/2003 | Suzuki et al. | |
| 7,954,739 | B2 * | 6/2011 | Shin-Ya .............. | B02C 18/0084 241/100 |
| 2001/0022328 | A1 * | 9/2001 | Oh ........................ | A23N 17/002 241/38 |

FOREIGN PATENT DOCUMENTS

| | | |
|---|---|---|
| JP | H02-090953 | 3/1990 |
| JP | H09-217405 | 8/1997 |
| JP | H10-109046 | 4/1998 |
| JP | H10-296109 | 11/1998 |
| JP | 2002-011446 | 1/2002 |
| JP | 2003-053314 | 2/2003 |
| JP | 2006-322686 | 11/2006 |
| JP | 2009-112882 | 5/2009 |
| JP | 4685973 | 5/2011 |
| JP | 2011-115716 | 6/2011 |
| KR | 10-2009-0041801 | 4/2009 |
| KR | 10-2014-0058912 | 5/2014 |

OTHER PUBLICATIONS

Office Action issued in Chinese Application No. 201510357884.0 dated Sep. 18, 2016, 16 pages (with English translation).

* cited by examiner

FOOD WASTE TREATMENT APPARATUS

CROSS REFERENCE TO RELATED APPLICATION

This application claims the benefit of Korean Patent Application No. 10-2014-0080616, filed on Jun. 30, 2014, which is hereby incorporated by reference as if fully set forth herein.

FIELD

This application relates to a portable food waste treatment apparatus.

BACKGROUND

Among methods to treat food waste generated in a kitchen, there is a method in which a drain in a sink is equipped with a garbage disposal unit to allow food waste discharged from the drain to be shredded prior to passing through plumbing.

The conventional garbage disposal unit as described above is configured to grind food waste introduced, along with water, through the sink's drain into small pieces using grinding blades thereof. The ground food waste may be discharged separately, or may pass through plumbing along with waste water.

Conventional garbage disposal units are adapted to grind food waste via the same grinding operation regardless of the components of introduced food waste. That is, the food waste is ground and discharged via the same grinding process even when food waste to be treated includes highly viscous food waste or fine powdered food waste.

SUMMARY

According to an innovative aspect of the subject matter described in this application, a control method of a food waste treatment apparatus includes the actions of connecting a discharge side of a grinder with a communication hole of a dehydrator, the communication hole being configured to receive food waste from the grinder; receiving, by the grinder, the food waste; grinding the food waste; receiving, by the dehydrator, the ground food waste; supplying a predetermined amount of wash water to a housing that includes the dehydrator; rinsing the ground food waste by moving wash water within the housing; discharging wash water by rotating the dehydrator and, simultaneously, opening a discharge duct; drying the ground food waste by rotating an agitator that is located in the dehydrator and, simultaneously, supplying dry air; and discharging the dried ground food waste by (i) connecting an outlet port of the housing with a communication portion of the dehydrator and (ii) rotating the agitator.

The method may include one or more of the following optional features. The action of supplying the predetermined amount of wash water to the housing includes supplying wash water through a first nozzle of the grinder or a second nozzle of the housing. The action of rinsing the ground food waste includes simultaneously rotating the agitator and the dehydrator. The agitator includes a door blade configured to close the communication hole of the dehydrator. The action of rinsing the ground food waste includes rotating the agitator and preventing the dehydrator from rotating. The action of discharging wash water by rotating the dehydrator and, simultaneously, opening the discharge duct includes closing a door blade of the agitator by rotating the dehydrator and the agitator, wherein closing the door blade closes the communication hole of the dehydrator. The actions further include washing the housing and the dehydrator after discharging the dried ground food waste.

The action of washing the housing and the dehydrator includes supplying additional wash water into the housing; washing the housing and the dehydrator by moving additional wash water; and draining additional wash water. The action of supplying the additional wash water includes supplying additional wash water through a first nozzle of the grinder or a second nozzle of the housing. The action of washing the housing and the dehydrator includes rotating the agitator and preventing the dehydrator from rotating. The communication hole of the dehydrator is connected with the outlet port of the housing. The action of draining additional wash water includes rotating the agitator and, simultaneously, opening the discharge duct of the housing. The action of washing the housing and the dehydrator includes simultaneously rotating both the agitator and the dehydrator. The action of draining additional wash water includes (i) rotating the agitator and the dehydrator and (ii) simultaneously, opening the discharge duct of the housing.

According to another innovative aspect of the subject matter described in this application, a control method of a food waste treatment apparatus includes grinding, dehydrating, drying, and discharging food waste; and washing a housing and a dehydrator that are configured to process the food waste.

The method may include one or more of the following optional features. The action of washing the housing and the dehydrator includes supplying wash water to the housing; washing the housing and the dehydrator by moving wash water; and draining wash water. The action of supplying wash water to the housing includes supplying wash water through a first nozzle located in a grinder. The action of washing the housing and the dehydrator includes simultaneously or selectively rotating both the dehydrator and an agitator. The action of draining wash water includes (i) simultaneously rotating the dehydrator and an agitator or selectively rotating the dehydrator and the agitator and (ii) simultaneously opening a discharge duct of the housing. The action of supplying wash water to the housing includes supplying wash water through a second nozzle located in the housing.

One object of the subject matter described in this application is to provide a food waste treatment apparatus which is capable of grinding and dehydrating food waste and a control method thereof.

In addition, another object of the subject matter described in this application is to provide a food waste treatment apparatus which employs a dryer and a drying method for removing a great quantity of moisture contained in ground food waste and a control method thereof.

In addition, another object of the subject matter described in this application is to provide a food waste treatment apparatus which includes a rotating shaft intersecting a food introduction direction and a control method thereof.

In addition, another object of the subject matter described in this application is to provide a food waste treatment apparatus, which is capable of removing highly viscous grounds or fine powder included in food waste before grinding of the food waste, thereby achieving enhanced grinding efficiency, and a control method thereof.

In addition, a further object of the subject matter described in this application is to provide a food waste treatment apparatus, which is capable of washing off and discharging residual food waste remaining in a space in which grinding of food waste occurs after grinding and discharge of the food waste, and a control method thereof.

DETAILED DESCRIPTION

Figure 1:
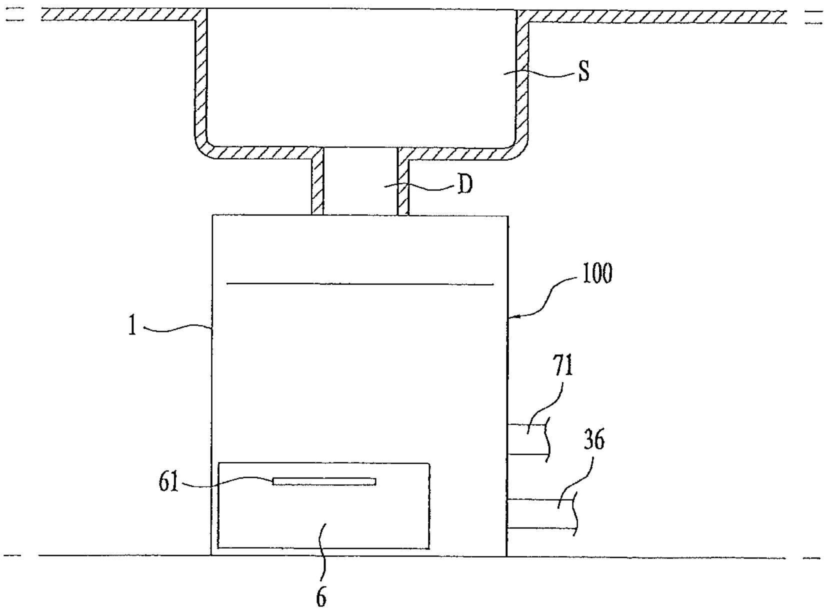
FIG. 1 is a schematic of an example installation state of a food waste treatment apparatus.
Figure 2:
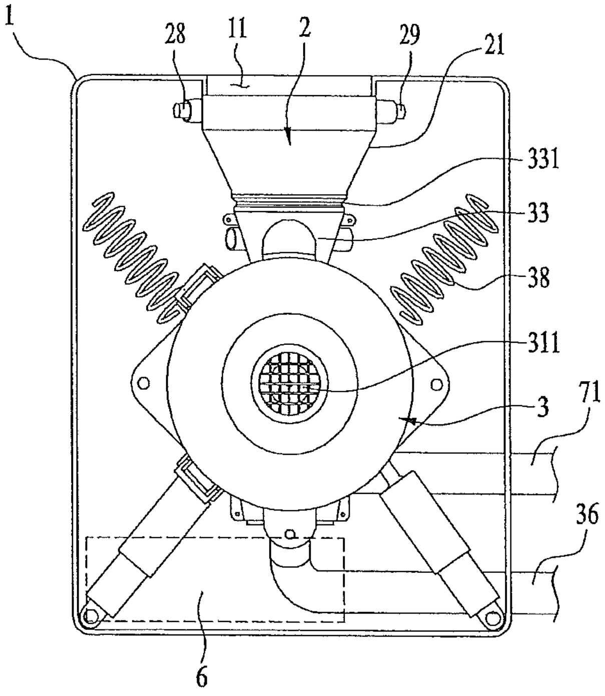
FIG. 2 is a front view of an example food waste treatment apparatus.
Figure 3:
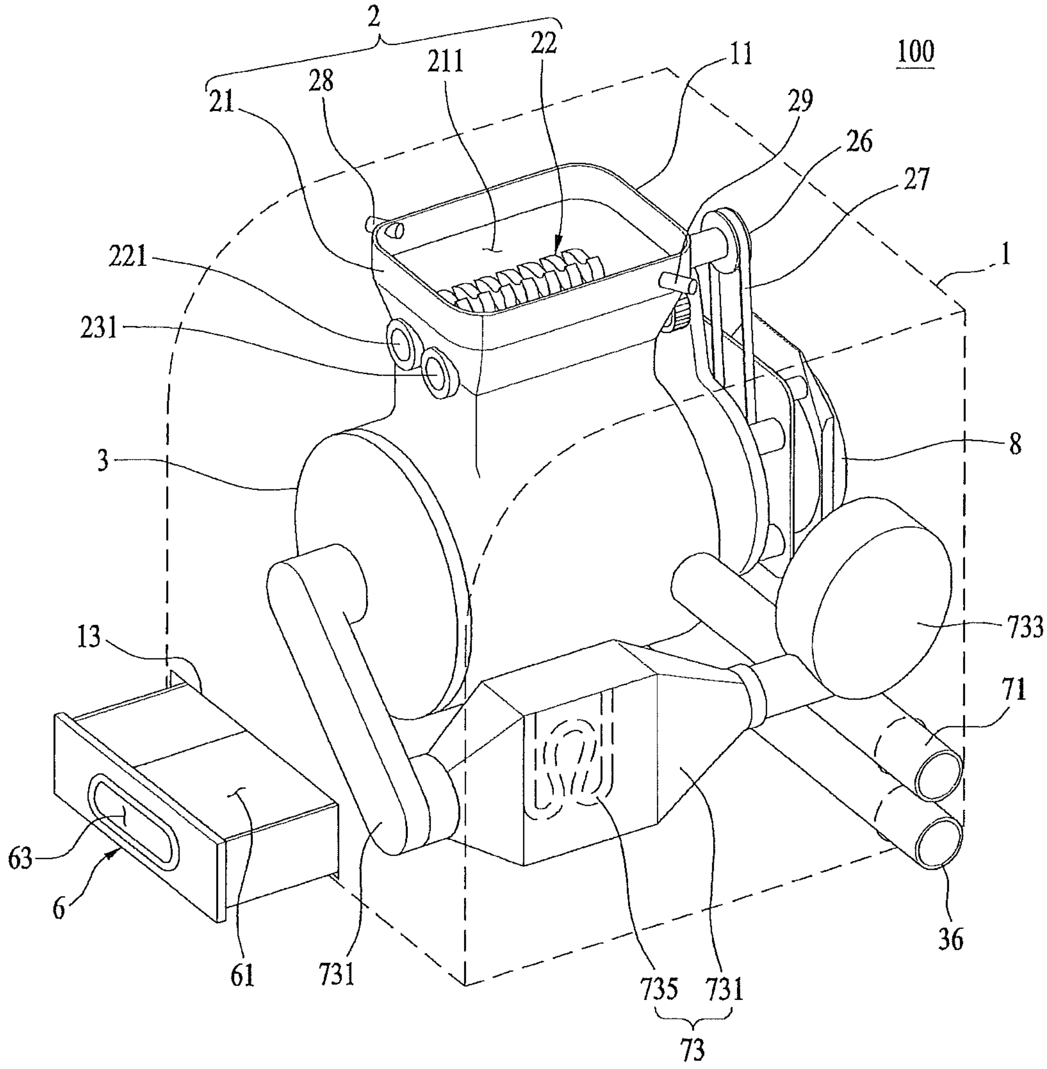
FIG. 3 is a perspective view of an example food waste treatment apparatus.

FIG. 1 illustrates an installation state of an example food waste treatment apparatus. FIGS. 2 and 3 each illustrate example food waste treatment apparatuses.

The food waste treatment apparatus 100 may be separably mounted to a drain D in a sink S. In some implementations, rather than being mounted to the sink S, the food waste treatment apparatus 100 may be an independent apparatus that is separated from the sink S and configured to grind, dehydrate, and dry food waste introduced thereto by a user. For convenience of description, the following description is based on the food waste treatment apparatus 100 that is separably mounted to the sink S.

As illustrated in FIGS. 1 and 2, the food waste treatment apparatus 100 includes a cabinet 1 separably mounted to the drain D through a connection region 11, a grinder 2 installed in the cabinet 1 to grind food waste supplied from the drain D, a housing 3 into which the food waste, ground in the grinder 2, is introduced, and a dehydrator 4 rotatably installed in the housing 3 to provide a space for storage of the food waste and a space for treatment, e.g., washing, grinding, dehydration, and/or drying, of the food waste.

Here, a drawer 6 may be installed in the cabinet 1 at a position below the housing 3 such that the food waste discharged from the housing 3 is stored in the drawer 6. The drawer 6, as illustrated in FIGS. 2 and 3, may include a drawer body 61 that is located below the housing 3 and provides a space in which the ground food waste is stored, and a handle 63 to assist the user in easily retracting the drawer body 61. In this case, the drawer body 61 may be retracted from the cabinet 1 through an opening 13 formed in the cabinet 1.

Meanwhile, the grinder 2 includes a support body 21 to guide the food waste, supplied from the connection region 11, to the housing 3, and blades arranged in the support body 21 to grind the food waste.

Figure 4:
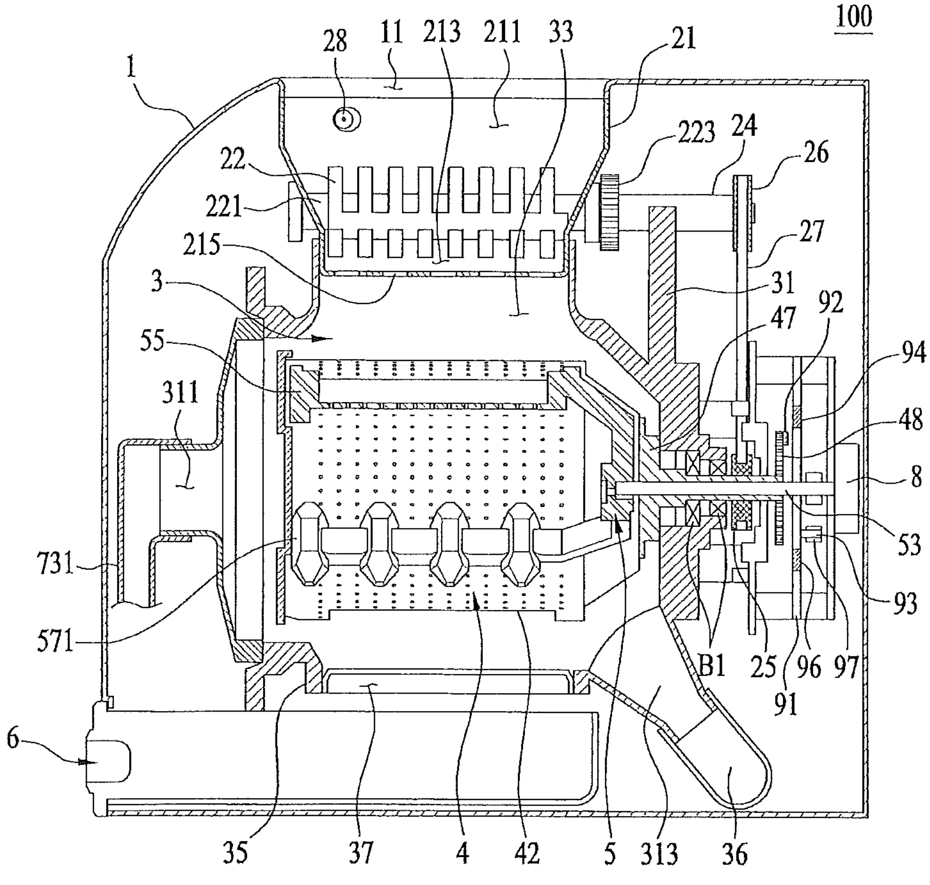
FIG. 4 is a sectional view of an example internal configuration of a food waste treatment apparatus.

As illustrated in FIG. 4, the support body 21 may take the form of a pipe, opposite sides of which are open. That is, the support body 21 may have an introduction side 211 that is in communication with the connection region 11 for supply of the food waste to the blades and a discharge side 213 for discharge of the food waste, ground by the blades, to the housing 3.

The connection region 11 of the cabinet 1 and the introduction side 211 of the support body 21 may be shaped to assure coupling of the drain D in the sink S thereto.

The blades may include a first rotary cutter 22 located between the introduction side 211 and the discharge side 213 and a second rotary cutter 23 located between the introduction side 211 and the discharge side 213, the first rotary cutter 22 and the second rotary cutter 23 being adapted to be rotated in opposite directions.

Figure 6:
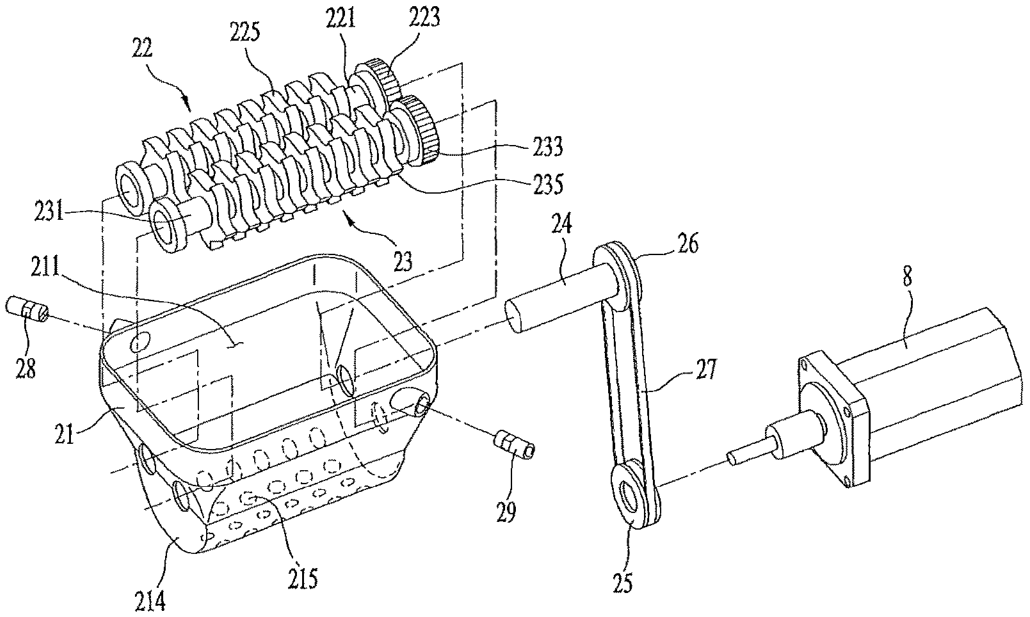
FIG. 6 is an exploded perspective view of an example grinder of a food waste treatment apparatus.

As illustrated in FIG. 6, the first rotary cutter 22 may include a first shaft 221 rotatably installed to the support body 21, a plurality of first cutters 225 coupled to the first shaft 221 so as to be located inside the support body 21, and a first gear 223 secured to the first shaft 221 so as to be located outside the support body 21.

The second rotary cutter 23 may include a second shaft 231 rotatably installed to the support body 21, a plurality of second cutters 235 coupled to the second shaft 231 so as to be located inside the support body 21, and a second gear 233 secured to the second shaft 231 so as to be connected to the first gear 223.

The first cutters 225 may be spaced apart from one another by a predetermined distance in the longitudinal direction of the first shaft 221, and the second cutters 235 may be located respectively in a space defined between a respective one of the first cutters 225 and a neighboring one of the first cutters 225.

The blades as described above may be rotated by a drive unit 8 that is used to rotate the dehydrator 4, or may be rotated by a drive unit that is provided separately from the drive unit 8.

In the case where the blades are rotated by the drive unit 8, a power transmission mechanism needs to be interposed between the grinder 2 and the drive unit 8. The power transmission mechanism may include a drive shaft 24 connected to the first gear 223, a driven pulley 26 coupled to the drive shaft 24, a driving pulley 25 configured to be rotated by the drive unit 8, and a belt 27 connecting the driving pulley 25 and the driven pulley 26 to each other.

When the drive unit 8 rotates the driving pulley 25, the first gear 223 is rotated by the belt 27 and the driven pulley 26. When the first gear 223 is rotated, the second gear 233 is rotated in an opposite direction of a rotation direction of the first gear 223. Thereby, the food waste, supplied through the introduction side 211, may be ground while passing between the first cutters 225 and the second cutters 235 and then moved to the discharge side 213.

Meanwhile, the food waste treatment apparatus 100 is capable of not only dehydrating the food waste using the dehydrator 4, but also drying the food waste using a drier 73 that will be described below. The dehydration and drying efficiencies of the food waste may be enhanced by maintaining the particle size of food waste discharged from the grinder 2 at a given size or less.

To maintain the particle size of food waste discharged from the grinder 2 at a given size or less, the discharge side 213 of the support body 21 may be provided with a receiving portion 214 that defines a space in which the first and second rotary cutters 22 and 23 are received. A plurality of discharge holes 215 may be perforated in the receiving portion 214 such that the food waste is discharged from the receiving portion 214 through the discharge holes 215.

At least a portion of the circumference of each first cutter 225 and at least a portion of the circumference of each second cutter 235 are located in the space defined by the receiving portion 214. As such, the food waste, ground by the respective cutters 225 and 235 and introduced into the receiving portion 214, is subjected to grinding by the respective cutters 225 and 235 until it is ground to a sufficient size to pass through the discharge holes 215.

Meanwhile, in the case of food waste that is difficult to be ground or has high viscosity, the food waste ground by the cutters 225 and 235 may remain at cutter surfaces, rather than being separated from the cutters 225 and 235. In this case, foul odors due to decomposition of the food waste may be generated.

Figure 7:
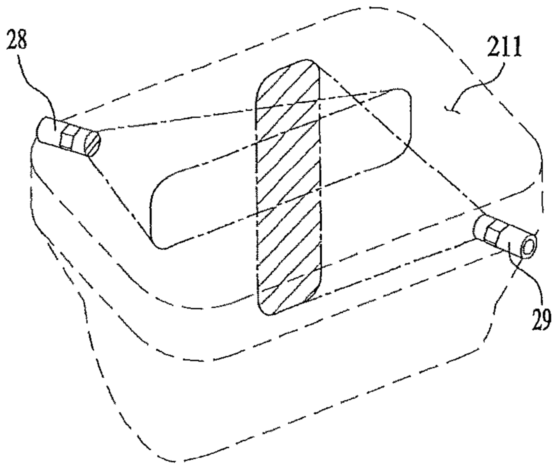
FIG. 7 is a schematic view of an example ejection of wash water in a food waste treatment apparatus.

To solve the problem as described above, the food waste treatment apparatus 100 may further include a wash water ejector to eject water into the support body 21. The wash water ejector may include a first nozzle 28 and a second nozzle 29 which are installed to the support body 21 to eject water supplied from the outside (see FIG. 7).

The first nozzle 28 may be shaped such that an ejection width in the direction parallel to the introduction side 211 is greater than an ejection width in the direction perpendicular to the introduction side 211. The second nozzle 29 may be shaped such that an ejection width in the direction perpendicular to the introduction side 211 is greater than an ejection width in the direction parallel to the introduction side 211. This serves to minimize an area of an inner space of the support body 21 where no water is supplied by differentiating supply areas of water ejected from the first nozzle 28 and the second nozzle 29.

To maximize this effect, the first nozzle 28 and the second nozzle 29 may be secured to the support body 21 so as to face each other and to eject water toward the first and second rotary cutters 22 and 23. In some implementations, an ejection angular range of water supplied from the first nozzle 28 and an ejection angular range of water supplied from the second nozzle 29 may be perpendicular to each other.

Figure 8:
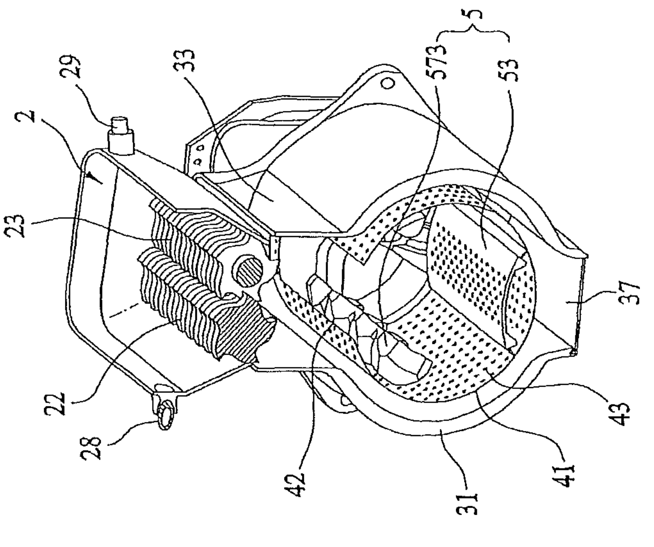
FIGS. 8(*a*), 8(*b*), and 8(*c*) are views of an example operating process of a dehydrator of the food waste treatment apparatus.
Figure 8:
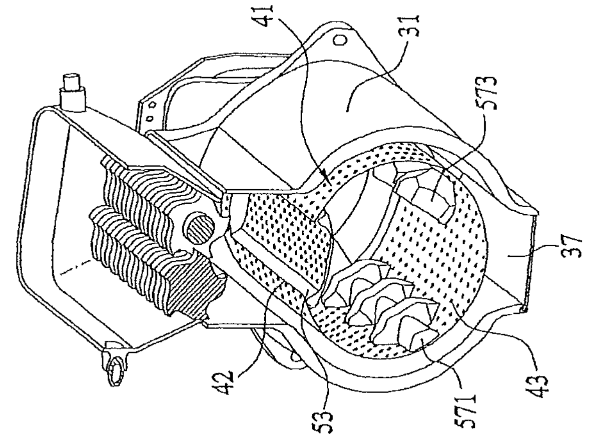
Figure 8:
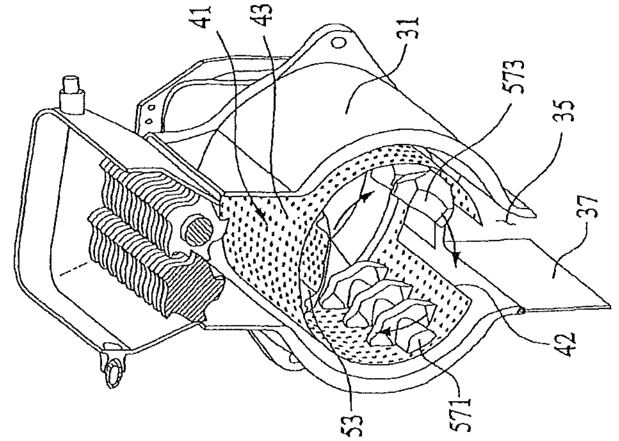

As illustrated in FIG. 8, the housing 3 may serve to connect the grinder 2 and the drawer 6 to each other, to provide a space in which the dehydrator 4 is received, and to guide water discharged from the drain D in the sink S to a sewage flow path.

The housing 3 includes a housing body 31 located between the grinder 2 and the drawer 6. The housing body 31 has an inlet port 33 that is in communication with the discharge side 213 or the discharge holes 215 of the grinder 2, and an outlet port 35 that is in communication with the drawer 6. That is, the housing 3 may take the form of a cylinder, opposite sides of which are open.

The housing 3 is connected to the support body 21 through a gasket 331 (see FIG. 2), which prevents leakage of water between the support body 21 and the housing 3. Meanwhile, when the gasket 331 is formed of a vibration dampening material such as rubber, the gasket 331 may also serve to attenuate vibration between the support body 21 and the housing 3.

The outlet port 35 of the housing body 31 is opened or closed by a housing door 37 installed to the housing body 31. The housing door 37 is rotated by a housing door drive unit to selectively open the outlet port 35.

Meanwhile, the housing body 31 is supported by a vibration attenuator 38 (see FIG. 2) within the cabinet 1. The vibration attenuator 38 serves to prevent vibration of the drive unit 8 located at the outer circumferential surface of the housing body 31 or vibration of the grinder 2 connected to the housing body 31 from being transmitted to the cabinet 1.

The vibration attenuator 38 may have any of various configurations so long as it can perform the above-described function. FIG. 2 illustrates the case where the vibration attenuator 38 includes a damper and a spring interposed between the cabinet 1 and the housing body 31 by way of example.

The housing body 31 is provided with a first communication portion 311 for introduction of outside air during drying of the food waste. In addition, the housing body 31 is provided with a second communication portion 313 for drainage of water or air from the housing body 31 to the outside of the cabinet 1. A detailed description thereof will follow.

The dehydrator 4, installed inside the housing body 31, serves to dehydrate and agitate the food waste ground in the grinder 2 and then supplied to the housing 3. The dehydrator 4 includes a storage body 41 located inside the housing body 31 to provide a food waste storage space, a rotating shaft 47 oriented in parallel with the ground to rotatably support the storage body 41 inside the housing body 31, and a communication hole 42 perforated in the storage body 41, the communication hole 42 being in communication with the inlet port 33 or the outlet port 35 according to a rotation angle of the storage body 41.

The storage body 41 takes the form of an empty cylinder and the rotating shaft 47 is secured to the rear surface of the storage body 41.

Meanwhile, the circumferential surface, the front surface and the rear surface of the storage body 41 is formed with a plurality of through-holes 43 to communicate the inside of the storage body 41 with the inside of the housing body 31. As such, when the storage body 41 is rotated, water contained in the food waste may be discharged to the housing body 31 through the through-holes 43.

Figure 5:
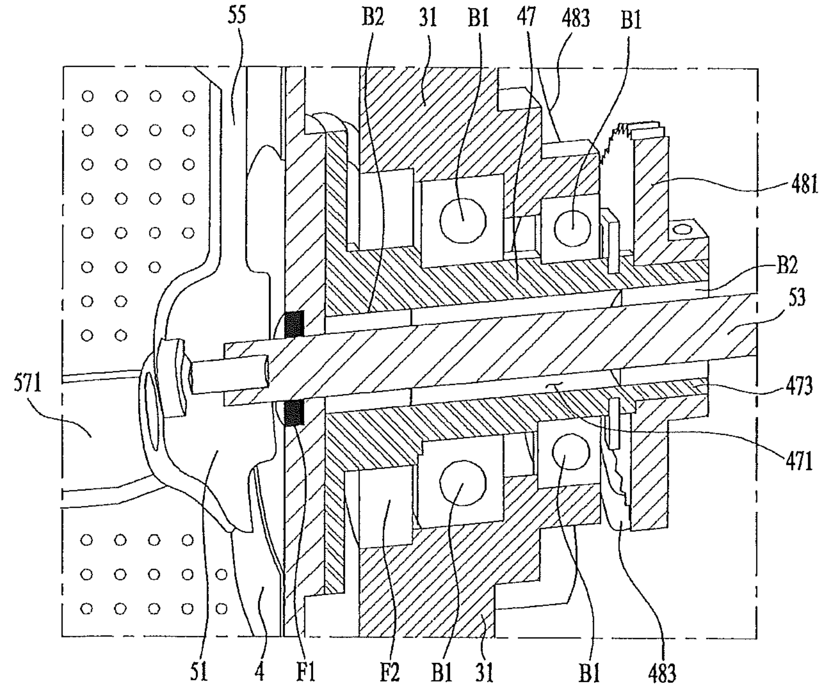
FIG. 5 is a sectional perspective view of an example shaft support portion of a food waste treatment apparatus.

As illustrated in FIGS. 4 and 5, the rotating shaft 47 serves to allow the storage body 41 to be rotatable about an axis that is in parallel with the ground. The rotating shaft 47 includes a shaft body 473 secured to the rear surface of the storage body 41 so as to penetrate the housing body 31 of the housing 3 and a shaft through-bore 471 formed through the shaft body 473 in the longitudinal direction of the shaft body 473.

The housing body 31 is provided with a bearing B1. The shaft body 473 is inserted into the bearing B1 so as to be rotatably coupled to the housing body 31. Meanwhile, a seal F2 is interposed between the housing body 31 and the shaft body 473 and serves to prevent water or food waste from entering a space between the housing body 31 and the shaft body 473.

The storage body 41 of the dehydrator 4 has a feature that it is rotated about an axis in parallel with the ground, rather than being rotated about an axis perpendicular to the ground.

In the case where the storage body 41 is rotated about the axis perpendicular to the ground, the user who attempts to discharge dehydrated food waste from the storage body 41 has to directly take the food waste out of the storage body 41 or to separate the storage body 41 from the food waste treatment apparatus 100, which causes user inconvenience.

In some implementations, in the case where the storage body 41 is rotated about the axis in parallel with the ground, the dehydrated food waste may be discharged from the storage body 41 via position control of the communication hole 42. Thus, it will be appreciated that rotation of the storage body 41 about the axis in parallel with the ground is more convenient than rotation of the storage body 41 about the axis perpendicular to the ground, as described in more detail below.

The food waste treatment apparatus 100 may further include an agitator 5 rotatably installed in the storage body 41, the agitator 5 serving to agitate the food waste inside the storage body 41 and to open or close the communication hole 42.

Figure 9:
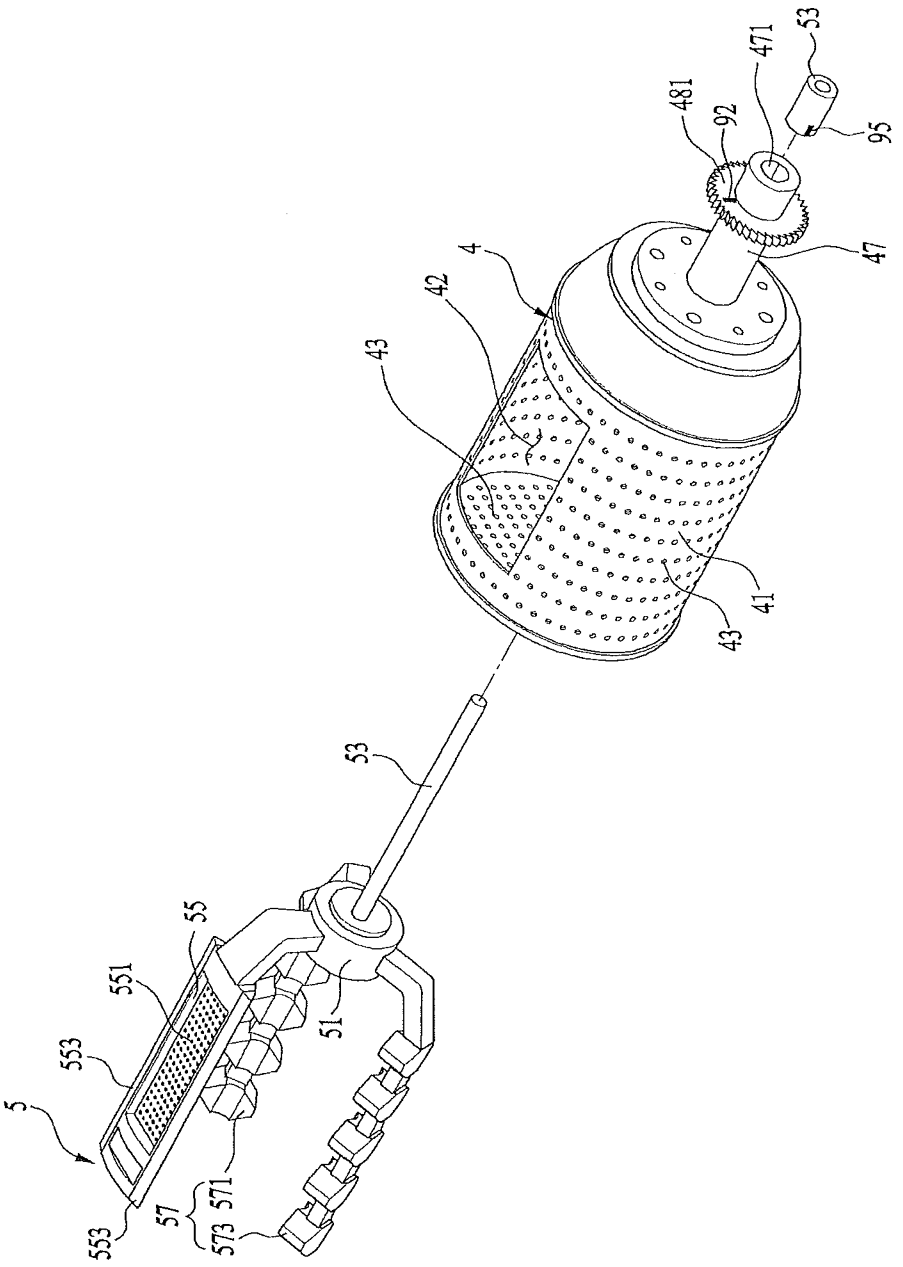
FIG. 9 is an exploded perspective view of an example dehydrator and an example agitator of the food waste treatment apparatus.

As illustrated in FIG. 9, the agitator 5 may include a base 51 located inside the storage body 41, a agitator rotating shaft 53 extending from the base 51 and inserted into the shaft through-bore 471, and a door blade 55 secured to the base 51 and located inside the storage body 41 to close the communication hole 42.

Meanwhile, as illustrated in FIGS. 4 and 5, the agitator rotating shaft 53 is inserted into the shaft through-bore 471 and serves to connect the base 51 and the drive unit 8 (e.g., a unit that serves to rotate the agitator 5 and is located outside the housing 3) to each other.

A seal F1 is provided in the shaft through-bore 471 to prevent the food waste or water inside the dehydrator 4 from entering a space between the shaft through-bore 471 and the agitator rotating shaft 53. That is, the seal F1 is affixed to the rear surface of the storage body 41 formed with the shaft through-bore 471 to prevent the food waste or water from entering the shaft through-bore 471.

The agitator rotating shaft 53 is rotatably supported by a clutch B2 that is located inside the shaft through-bore 471. The clutch B2 may be a one-way clutch that transmits power, provided by the drive unit 8 only in one direction among the clockwise direction and the counterclockwise direction, to the shaft body 473.

Accordingly, when the drive unit 8 rotates the agitator rotating shaft 53 in a first direction (any one direction among the clockwise direction and the counterclockwise direction), the clutch B2 transmits rotational power provided by the agitator rotating shaft 53 to the shaft body 473, thus causing both the storage body 41 and the agitator 5 to be rotated together.

However, when the drive unit 8 rotates the agitator rotating shaft 53 in a second direction (the other direction among the clockwise direction and the counterclockwise direction, e.g., an opposite direction of the first direction), the clutch B2 does not transmit rotational power provided by the agitator rotating shaft 53 to the shaft body 473, thus causing only the agitator 5 to be rotated without rotation of the storage body 41.

Despite the fact that the clutch B2 allows only the agitator 5 to be rotated without rotation of the storage body 41, the food waste treatment apparatus 100 may further include a lock 48 to prevent the storage body 41 from being rotated along with the agitator 5 when the agitator rotating shaft 53 is rotated in the second direction (e.g., to prevent the storage body 41 from being unintentionally rotated along with the agitator 5).

The lock 48 may include a first fastener 481 provided at the shaft body 473 and a second fastener 483 provided at the housing body 31 so as to be separably fastened to the first fastener 481.

Figure 10:
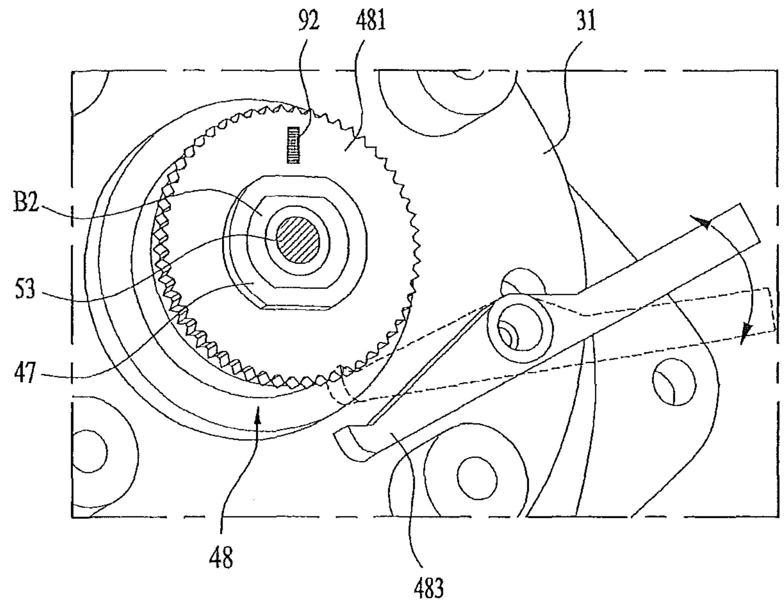
FIG. 10 is a partial perspective view of an example lock of a food waste treatment apparatus.

As illustrated in FIG. 10, the first fastener 481 may be a gear that is provided with teeth along the outer circumference thereof and secured to the shaft body 473. The second fastener 483 may be a bar that is rotatably coupled to the housing body 31 and has a free end to constrain rotation of the teeth of the first fastener 481.

The second fastener 483 is adapted to receive rotational power from a power supply device such as, for example, a motor or a solenoid. Thus, in the food waste treatment apparatus 100, the agitator 5 and the storage body 41 may be rotated together when the drive unit 8 rotates the agitator 5 in the first direction, and only the agitator 5 may be rotated when the drive unit 8 rotates the agitator 5 in the second direction in a state in which the second fastener 483 and the first fastener 481 are engaged with each other.

Meanwhile, as illustrated in FIG. 9, the agitator 5 may further include an agitation blade 57 that is secured to the base 51 so as to be rotatable inside the storage body 41. The agitation blade 47 serves to enhance agitation efficiency of the food waste stored in the storage body 41.

The agitation blade 47 may include a first agitation blade 471 and a second agitation blade 573 which are spaced apart from the door blade 55 by the same angle on the basis of the agitator rotating shaft 53. That is, in the case where the agitation blade 57 includes the first agitation blade 571 and the second agitation blade 573, the door blade 55, the first agitation blade 571 and the second agitation blade 573 are spaced apart from one another by 120 degrees about the agitator rotating shaft 53.

To facilitate agitation of the food waste, the first agitation blade 571 and the second agitation blade 573 may be provided with a plurality of bosses.

The door blade 55 included in the agitator 5 may have a plurality of door through-holes 551 perforated in the door blade 55 to communicate the inside of the storage body 41 with the inside of the housing body 31.

Assuming that the door blade 55 has no door through-holes 551, water separated from the food waste during rotation of the storage body 41 cannot be discharged in the direction in which the door blade 55 is located, which may cause eccentric rotation of the storage body 41. The door through-holes 551 serve to prevent this problem.

In addition, the door through-holes 551 serve to enhance drying efficiency by allowing air supplied by the drier 73 that will be described below to be supplied into the storage body 41.

Meanwhile, to facilitate agitation of the food waste by the door blade 55, the door blade 55 may be provided with scrapers 553.

Figure 11:
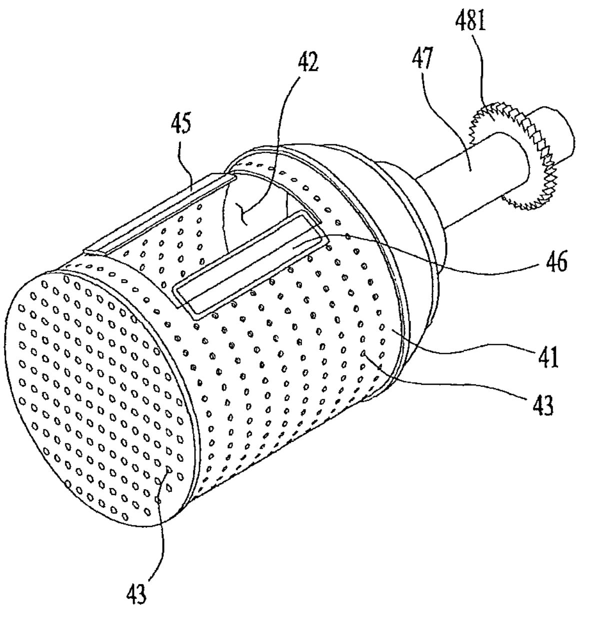
FIG. 11 is a perspective view of an example dehydrator and an example guide of the food waste treatment apparatus.
Figure 12:
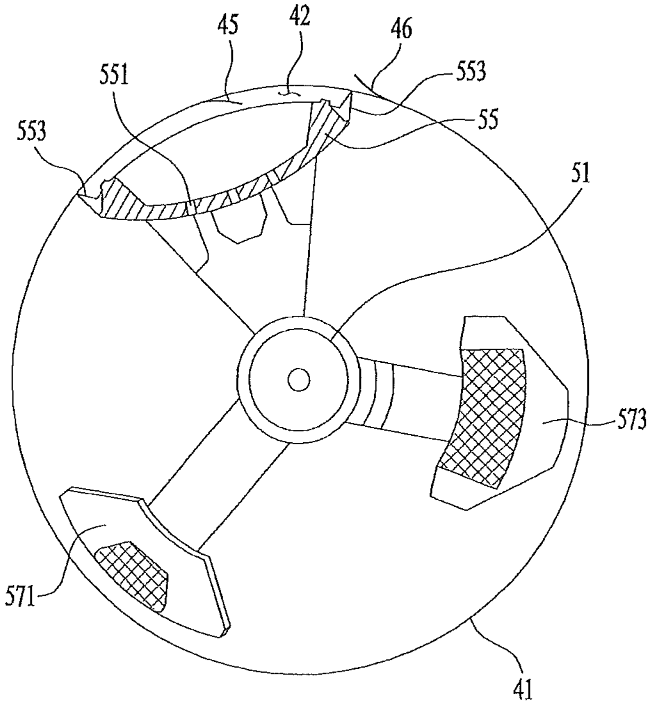
FIG. 12 is a sectional view of an example dehydrator and an example guide of the food waste treatment apparatus.

As illustrated in FIGS. 11 and 12, the scrapers 553 may protrude from the surface of the door blade 55 so as to come into contact with the surface of the storage body 41 and may be located respectively at both facing longitudinal ends of the door blade 55 that are in parallel with the rotation axis of the storage body 41. The scrapers 553 may be formed of an elastic material such as rubber.

When the door blade 55 provided with the scrapers 553 is rotated, the food waste stored inside the storage body 41 is easily agitated by the scrapers 553. However, the scarpers 553 may cause the food waste inside the storage body 41 to leak from the storage body 41 when the door blade 55 passes through the communication hole 42.

To solve this problem, the dehydrator 4 may further include a guide to prevent the food waste inside the storage body 41 from leaking from the storage body 41 through the communication hole 42.

The guide may include a first guide 45 protruding from the communication hole 42 toward the rotation center of the storage body 41, and a second guide 46 protruding from the communication hole 42 away from the rotation center of the storage body 41.

Accordingly, assuming that the second direction for rotation of the agitator 5 alone is set to the clockwise direction, upon rotation of the door blade 55, the first guide 45 may guide the food waste toward the storage body 41 and the second guide 46 may prevent separation of the food waste remaining on the scrapers 553.

The food waste treatment apparatus **100*a* having the above-described configuration may further include a first position sensing unit to sense a position of the communication hole 42 of the dehydrator 4 and a second position sensing unit to sense a position of the door blade 55**.

Figure 13:
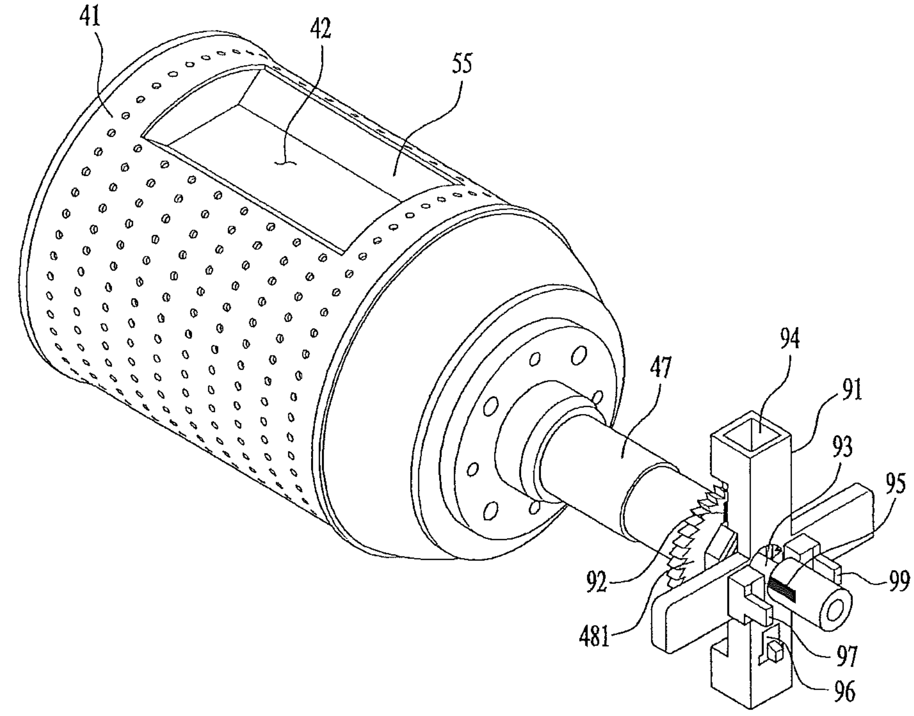
FIG. 13 is a perspective view of an example position sensing unit of a food waste treatment apparatus.

As illustrated in FIG. 13, the first position sensing unit may include a first magnetic substance 92 fixed to the rotating shaft 47 of the dehydrator 4, the first magnetic substance 92 being located next to the communication hole 42 in the longitudinal direction of the storage body 41, a first sensor 94 located at the housing body 31 at a position next to the inlet port 33 to sense the magnetic force of the first magnetic substance 92, and a second sensor 96 located at the housing body 31 at a position next to the outlet port 35 to sense the magnetic force of the first magnetic substance 92.

The first magnetic substance 92 may be attached to the first fastener 481 secured to the shaft body 473, and the first sensor 94 and the second sensor 96 may be attached to a first sensor support member 91 that is located outside the housing body 31.

In the case where the inlet port 33 and the outlet port 35 of the housing body 31 are located respectively at the top surface and the bottom surface of the housing body 31 (spaced apart from each other by 180 degrees on the basis of the shaft body 473), the first sensor 94 and the second sensor 96 need to be spaced apart from each other by 180 degrees.

Meanwhile, the second position sensing unit may include a second magnetic substance 95 fixed to the agitator rotating shaft 53, and a third sensor 97 located outside the housing body 31, the third sensor 97 judging whether or not the door blade 55 closes the communication hole 42 by sensing the magnetic force of the second magnetic substance 95.

The second magnetic substance 95 may be spaced apart from the door blade 55 by a predetermined angle about the agitator rotating shaft 53 and may be located next to the door blade 55 in the longitudinal direction of the agitator rotating shaft 53.

Meanwhile, as illustrated in FIG. 13, the example case where the second magnetic substance 95 is spaced apart from the door blade 55 by 90 degrees about the agitator rotating shaft 53 and the third sensor 97 is fixed to a second support member 93 that is located outside the housing body 31, the third sensor 97 being spaced apart from the first sensor 94 by 90 degrees.

Meanwhile, the food waste treatment apparatus 100 may further include the drier 73 to dry the food waste stored in the dehydrator 4 by supplying air to the housing 3.

As illustrated in FIG. 3, the drier 73 may include a supply duct 731 to guide air to the housing body 31, a fan 733 to supply air to the supply duct 731, a heater 755 to heat air introduced into the supply duct 731, and the exhaust duct 71 to communicate the inside of the housing body 31 with the outside of the cabinet 1.

The supply duct 731 may be connected to the first communication portion 311 of the housing body 31, and the exhaust duct 71 may connect the second communication portion 313 of the housing body 31 and a plughole 36 located outside the cabinet 1 to each other.

As such, when the fan 733 is operated, air inside the cabinet 1 is moved to the housing body 31 through the supply duct 731 and heated by the heater 735.

The air introduced into the housing body 31 is supplied to the inside of the storage body 41 through the through-holes 43 formed, for example, in the circumferential surface and the front surface of the storage body 41. Then, the air heat exchanged with the food waste is discharged from the cabinet 1 through the exhaust duct 71.

The exhaust duct 71 serves as an exhaust pipe that discharges air during drying of the food waste. However, the exhaust duct 71 serves as a drain pipe that discharges water from the inside of the housing body 31 to the plughole during dehydration or grinding of food waste during which drying of the food waste is not implemented.

An example operation process of the food waste treatment apparatus **100*a* will be described below in detail with reference to FIG. 14**.

Figure 14:
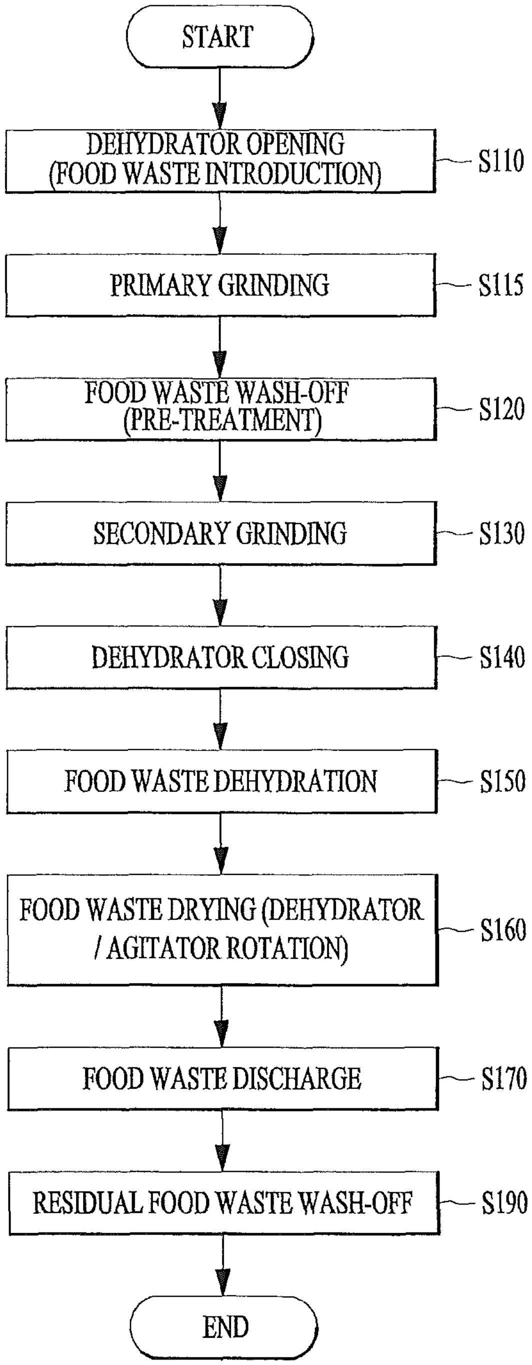
FIG. 14 is a flowchart of an example control method of the food waste treatment apparatus.

FIG. 14 illustrates an example control method of the food waste treatment apparatus.

First, a controller performs a dehydrator opening step S110 of communicating the dehydrator 4 and the housing 3 with each other to enable introduction of food waste. When the food waste is introduced by the user as the dehydrator opening step S110 is completed, the controller proceeds to a primary grinding step S115 of primarily grinding the introduced food waste and guiding the ground food waste to the dehydrator 4. Then, the controller performs a food waste wash-off step S120 of removing, for example, highly viscous grounds or fine powder included in the food waste, primarily ground and introduced into the dehydrator 4. Once the food waste has been washed off in the food waste wash-off step S120, the controller performs a secondary grinding step S130 of grinding the food waste inside the dehydrator 4. After completion of the secondary grinding step S130, the controller proceeds to a closing step S140 of closing the communication hole 42 of the dehydrator 4. Then, the closing step S140 is followed by a food waste dehydration step S150 of removing moisture contained in the ground food waste. Then, the controller proceeds to a food waste drying step S160 and a food waste discharge step S170 in sequence. Finally, once the dried food waste has been discharged, the controller proceeds to a residual food waste wash-off step S190 of washing the housing 3 and the dehydrator 4 having undergone the washing, grinding, and drying of the food waste.

Meanwhile, among the steps as described above, the food waste wash-off step S120 of removing highly viscous grounds or fine powder included in the food waste from the food waste and the residual food waste wash-off step S190 of washing off food waste residues inside the food waste treatment apparatus 100*a*, which has performed the washing, grinding and drying of the food waste, after completion of all of the aforementioned steps may be selectively performed according to user selection, and may be omitted as needed.

Figure 15:
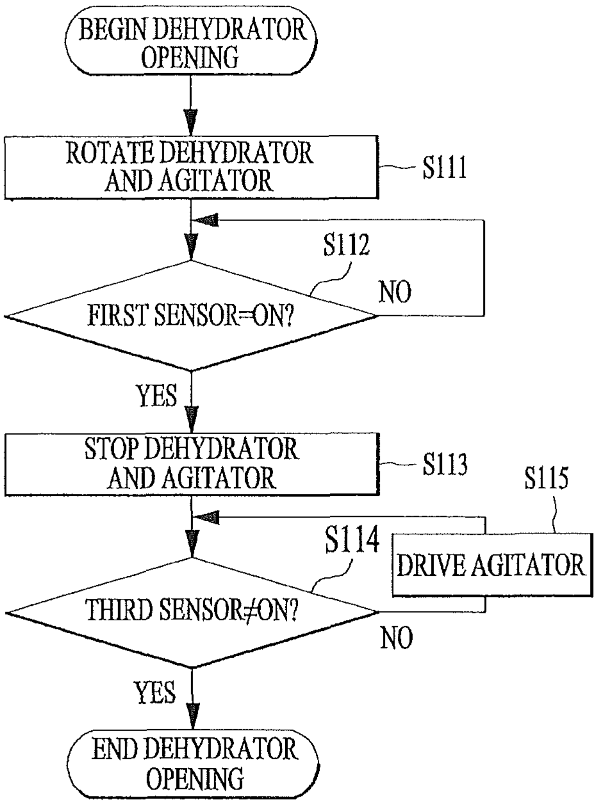
FIG. 15 is a flowchart of an example dehydrator opening step.
Figure 16:
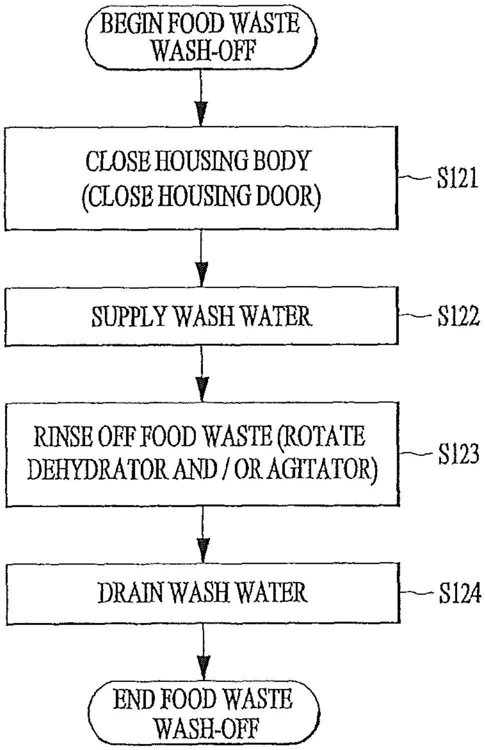
FIG. 16 is a flowchart of an example food waste wash-off step.
Figure 17:
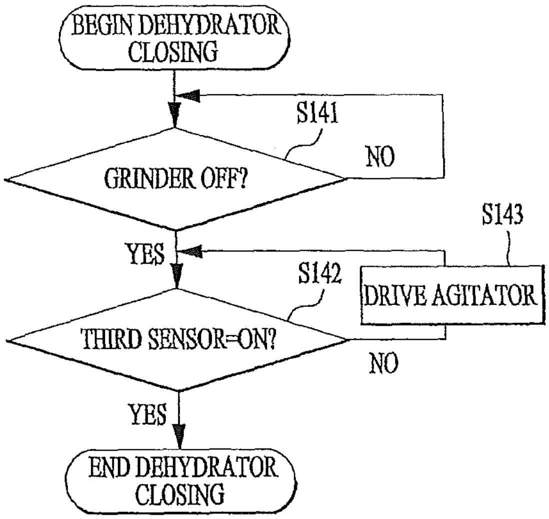
FIG. 17 is a flowchart of an example dehydrator closing step.
Figure 18:
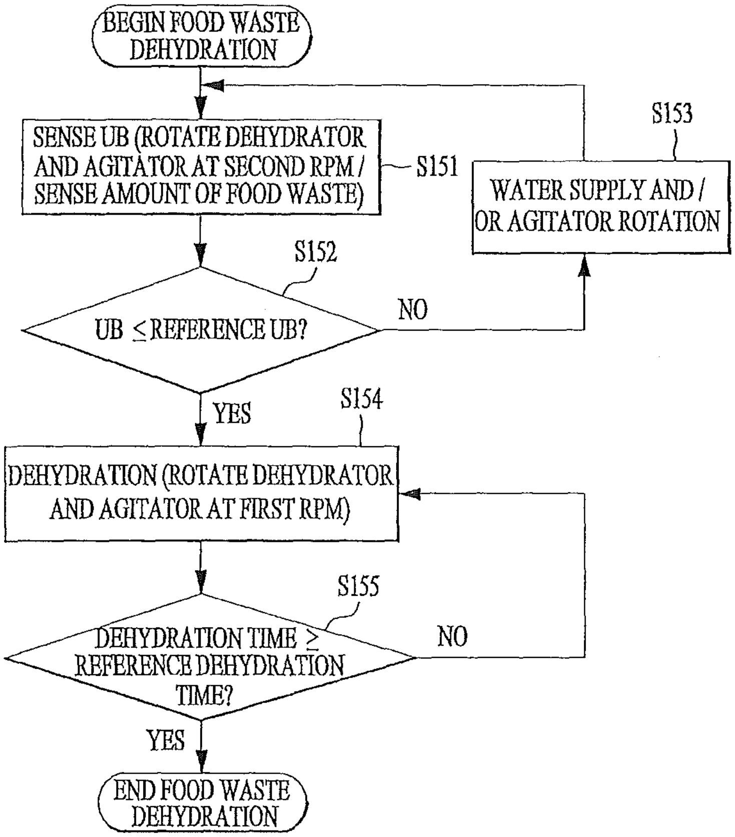
FIG. 18 is a flowchart of an example food waste dehydration step.
Figure 19:
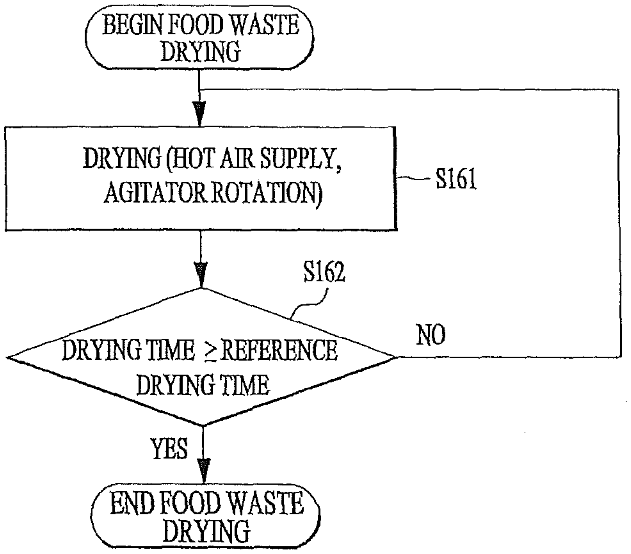
FIG. 19 is a flowchart of an example food waste drying step.
Figure 20:
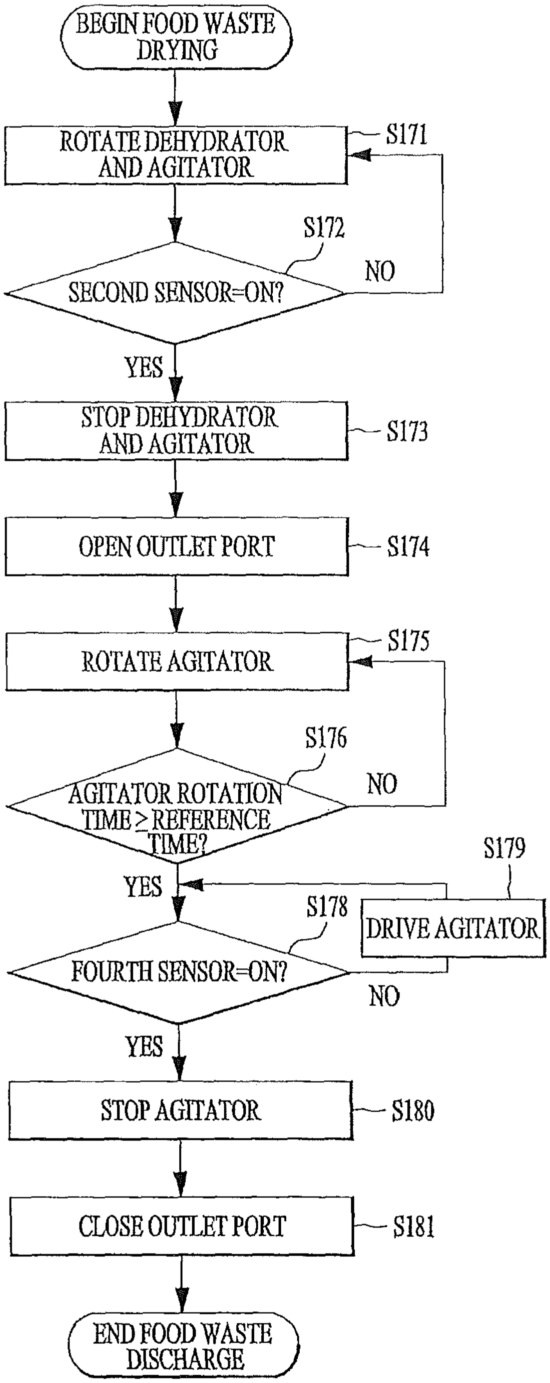
FIG. 20 is a flowchart of an example food waste discharge step.
Figure 21:
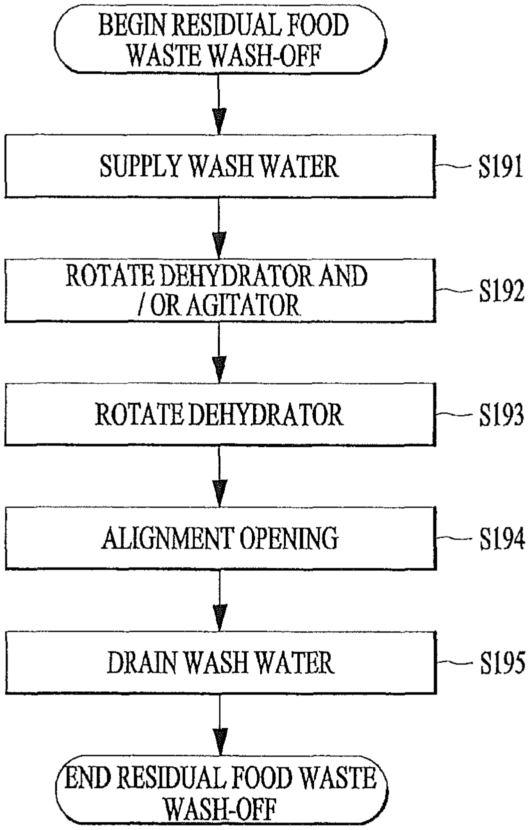
FIG. 21 is a flowchart of an example residual food waste wash-off step.

FIG. 15 illustrates an example dehydrator opening step. FIG. 16 illustrates an example food waste wash-off step. FIG. 17 illustrates an example dehydrator closing step. FIG. 18 illustrates an example food waste dehydration step. FIG. 19 illustrates an example food waste drying step. FIG. 20 illustrates an example food waste discharge step. FIG. 21 illustrates an example residual food waste wash-off process.

As illustrated in FIG. 15, the dehydrator opening step S110 may include a first communication step S111, S112 and S113 of communicating the communication hole 42 with the inlet port 33 of the housing 3 by rotating the dehydrator 4 and an opening step S114 and S115 of opening the communication hole 42 by the door blade 55 as the agitator 5 is rotated alone.

The first communication step includes rotating the agitator 5 and the dehydrator 4 together as the drive unit 8 rotates the agitator rotating shaft 53 in the first direction, e.g., in a direction for simultaneous rotation of both the dehydrator 4 and the agitator 5, (S111) and stopping rotation of the agitator 5 and the dehydrator 4 when the communication hole 42 of the dehydrator 4 reaches a position coinciding with the inlet port 33 of the housing 3 (S112 and S113).

Judging whether or not the communication hole 42 reaches the position for communication with the inlet port 33 (S112) is based on whether or not the first sensor 94 senses the magnetic force of the first magnetic substance 92.

Since the first magnetic substance 92 is fixed to the rotating shaft 47 of the dehydrator 4 so as to be located next to the communication hole 42 and the first sensor 94 is attached to the housing 3 so as to be located next to the inlet port 33, a controller to control operation of the drive unit 8, change in the rotation direction of the drive unit 8, operation of the drier 73 and the dehydrator 4, and operation of the wash water ejector may determine that the communication hole 42 is located below the inlet port 33 when the first sensor 94 senses the magnetic force of the first magnetic substance 92.

Upon judging that the communication hole 42 is located below the inlet port 33, the controller stops operation of the drive unit 8 to stop rotation of the dehydrator 4 and the agitator 5 (S113).

In some implementations, upon completion of the first communication step S111, S112, and S113, the controller performs an opening step S114 and S115 of causing the agitator 5 to be rotated in the second direction by changing the rotation direction of the drive unit 8. In some implementations, the dehydrator 4 stops and only the agitator 5 rotates. The opening step includes judging whether or not the third sensor 97 senses the magnetic force of the second magnetic substance 95 (S114).

Since the second magnetic substance 95 and the third sensor 97 are provided respectively at the agitator rotating shaft 53 and the housing 3 so as to face each other when the door blade 55 closes the communication hole 42, the controller may judge that the door blade 55 closes the communication hole 42 when the third sensor 97 senses the magnetic force of the second magnetic substance 95 and may also judge that the door blade 55 opens the communication hole 42 when the third sensor 97 cannot sense the magnetic force of the second magnetic substance 95.

Accordingly, after judging whether or not the third sensor 97 senses the second magnetic substance 95, the opening step includes rotating only the agitator 5 until the third sensor 97 cannot sense the second magnetic substance 95 upon judging that the third sensor 97 senses the second magnetic substance 95, so as to open the communication hole 42 of the dehydrator 4 (S115). In this case, a positional relationship between the housing 3, the dehydrator 4, and the agitator 5 is as illustrated in FIG. 8(*a*).

Subsequently, upon completion of the dehydrator opening step S110, the grinding step S115 of primarily grinding the introduced food waste is performed. The grinding step S115 is a step in which the controller rotates the first rotary cutter 22 and the second rotary cutter 23 via the drive unit 8 or a separate drive unit. The grinding step S115 may further include ejecting water via the wash water ejector 28 and 29 during rotation of the first rotary cutter 22 and the second rotary cutter 23. This serves to prevent the food waste from remaining on the first and second rotary cutters 22 and 23.

Meanwhile, upon completion of the primary grinding step S115, the controller may perform the food waste wash-off step S120 of washing off the food waste received in the dehydrator 4. Here, the food waste wash-off step S120 serves to remove highly viscous food waste grounds or fine food waste powder, which may hinder implementation of the grinding step S130, included in the food waste received in the dehydrator 4.

The food waste wash-off step S120, as illustrated in FIG. 16, includes a wash water supply step S122 of washing off highly viscous grounds and fine powder included in the food waste, a food waste rinsing step S123 of removing the highly viscous grounds and fine powder included in the food waste using the supplied wash water, and a wash water drainage step S124 of draining the wash water used to wash off the food waste.

First, prior to supplying wash water to the housing body 31, the housing door 37 provided at the bottom of the housing body 31 is closed (S121). Here, in a state in which the housing door 37 has already been closed, the step of closing the housing door 37 may be omitted.

Subsequently, wash water for rinsing off the food waste is supplied to the housing body 31 (S122). The supply of wash water may be performed via the first nozzle 28 and the second nozzle 29 of the wash water ejector included in the grinder 2, and may be directly performed within the housing body 31 via a separate water supply aperture.

Meanwhile, upon completion of the supply of wash water, the step S123 of rinsing off the food waste stored in the dehydrator 4 is performed. Here, the food waste rinsing step S123 may selectively include rotating the agitator 5 alone and rotating the agitator 5 and the dehydrator 4 simultaneously.

First, the case where the dehydrator 4 remains stationary and only the agitator 5 is rotated in the food waste rinsing process S123 will be described below.

The controller maintains communication between the communication hole 42 of the dehydrator 4 and the inlet port 33 of the housing body 31 as in the above-described dehydrator opening step S110 and rotates the agitator 5 at predetermined RPM for a predetermined time to mix the food waste stored in the dehydrator 4 with wash water. Thereby, as the food waste received in the dehydrator 4 is mixed with the wash water stored in the housing body 31, highly viscous grounds and fine powder included in the food waste are diluted or separated.

Next, the case where the agitator 5 and the dehydrator 4 are rotated simultaneously in the food waste rinsing process S123 will be described.

To rotate the agitator 5 and the dehydrator 4 simultaneously, first, it is necessary to close the communication hole 42 formed in the dehydrator 4. That is, when the agitator 5 and the dehydrator 4 are rotated in a state in which the communication hole 42 of the dehydrator 5 is not closed, the food waste introduced into the dehydrator 4 may leak from between the dehydrator 4 and the housing body 31. Therefore, the communication hole 42 of the dehydrator 4 needs to be closed using the door blade 55 of the agitator 5 before the dehydrator 4 and the agitator 5 are rotated simultaneously.

Here, closing of the communication hole 42 of the dehydrator 4 is performed based on judgment of whether or not the third sensor 97 senses the magnetic force of the second magnetic substance 95. Since that the third sensor 97 cannot sense the magnetic force of the second magnetic substance 95 suggests that the communication hole 42 of the dehydrator 4 is opened, the controller rotates the drive unit 8 in the second direction, thus only rotating the agitator 5, until the third sensor 97 senses the magnetic force of the second magnetic substance 95. A positional relationship between the housing 3, the dehydrator 4, and the agitator 5 in a closed state of the communication hole 42 of the dehydrator 4 is as illustrated in FIG. 8(*b*).

Subsequently, the dehydrator 4 and the agitator 5 remain in a state in which the door blade 55 of the agitator 5 closes the communication hole 42 of the dehydrator 4. The agitator 5 and the dehydrator 4 are rotated at predetermined RPM for a predetermined time to mix the food stored in the dehydrator 4 with wash water. Thereby, as the food waste received in the dehydrator 4 is mixed with the wash water stored in the housing body 31, highly viscous grounds and fine powder included in the food waste are diluted or separated.

Meanwhile, once impurities such as, for example, the highly viscous grounds and fine powder have been separated from the food waste via rotation of the dehydrator 4 and/or the agitator 5, the wash water mixed with the impurities such as, for example, the highly viscous grounds and fine powder is drained (S124). Here, drainage of the wash water may be performed by opening the exhaust duct 71 provided at the housing body 31.

Subsequently, the food waste wash-off step S120 of the dehydrator 4 is completed, and the controller performs the secondary grinding step S130 of secondarily grinding the food waste stored in the dehydrator 4. Here, the secondary grinding step S130 is a process of mixing and grinding the food waste stored in the dehydrator 4 by rotating only the agitator 5 in a state in which rotation of the dehydrator 4 stops. Here, through rotation of the agitator 5, the food waste stored in the dehydrator 4 is agitated within the dehydrator 4 by the door blade 55 and the agitation blade 57 of the agitator 5 and, simultaneously, ground by friction with the inner surface of the dehydrator 4. However, only the primary grinding step S110 using the grinder 2 may be performed and the secondary grinding step S130 may be omitted according to the amount and kind of the food waste.

Subsequently, upon completion of the food waste wash-off step S120 or the secondary grinding step S130, the dehydrator closing step S140 of closing the dehydrator 4 for dehydration of the food waste is performed. The food waste treatment apparatus 100 may be adapted to perform dehydration of the food waste by simultaneously rotating the agitator 5 and the dehydrator 4.

Accordingly, when the agitator 5 and the dehydrator 4 are rotated in a state in which the communication hole 42 of the dehydrator 4 is not closed, the food waste introduced into the dehydrator 4 may leak from between the dehydrator 4 and the housing body 31. Accordingly, it is necessary to close the communication hole 42 of the dehydrator 4 using the door blade 55 of the agitator 5 prior to simultaneously rotating the dehydrator 4 and the agitator 5.

Meanwhile, as illustrated in FIG. 17, the controller judges whether or not the grinder 2 is operated and stands by the operation stop of the grinder 2 upon judging that operation of the grinder 2 does not stop (S141). Here, upon checking the operation stop of the grinder 2, the controller begins sensing of the third sensor 97 (S142).

Here, closing of the communication hole 42 of the dehydrator 4 is performed based on judgment of whether or not the third sensor 97 senses the magnetic force of the second magnetic substance 95. Since that the third sensor 97 cannot sense the magnetic force of the second magnetic substance 95 suggests that the communication hole 42 of the dehydrator 4 is opened, the controller rotates the drive unit 8 in the second direction, thus only rotating the agitator 5, until the third sensor 97 senses the magnetic force of the second magnetic substance 95 (S143). A positional relationship of the housing 3, the dehydrator 4, and the agitator 5 in a closed state of the communication hole 42 of the dehydrator 4 is as illustrated in FIG. 8(*b*).

Subsequently, the controller performs the dehydration step S150 of dehydrating the food waste stored in the dehydrator 4 upon completion of the dehydrator closing step S140.

As illustrated in FIG. 18, the dehydration step S150 is a step of discharging the water contained in the food waste from the storage body 41 of the dehydrator 4 into the housing body 31 by simultaneously rotating the dehydrator 4 and the agitator 5 at a predetermined first RPM, thus rotating the agitator rotating shaft 53 in the first direction.

Here, the storage body 41 of the dehydrator 4 may fail to maintain dynamic equilibrium, or dynamic balance, according to a position of the food waste stored therein, thereby being rotated. Dynamic equilibrium is a state in which centrifugal force or moment created by the centrifugal force becomes zero with respect to a rotating shaft during rotation of a rotator. In the case of a rigid body, the rigid body maintains dynamic equilibrium when mass distribution is constant about a rotating shaft.

Dynamic equilibrium in the food waste treatment apparatus 100*a* may be understood as the case where mass distribution of the food waste about the rotating shaft 47 of the storage body 41 is within an allowable range during rotation of the storage body 41 in which the food waste is received, e.g., the case where the storage body 41 is rotated while vibrating within an allowable range.

On the other hand, an unbalanced state in the food waste treatment apparatus 100 occurs in the case where mass distribution of the food waste about the rotating shaft 47 is not uniform, or not within an allowable range, during rotation of the storage body 41, e.g., the case where the food waste is not uniformly distributed within the storage body 41.

At this time, when the storage body 41 is rotated in an unbalanced state, this may cause deterioration in dehydration efficiency and generation of vibration and noise of the storage body 41 and the housing body 31. Therefore, the control method may further include an unbalance removal step S151 and S152 of removing such unbalance prior to beginning the dehydration step S150.

As illustrated in FIG. 18, the unbalance removal step includes a sensing step S151 of sensing unbalance of the storage body 41 of the dehydrator 4 and a judgment step S152 of judging whether or not the sensed unbalance is a reference UB (reference value) or less.

Here, the sensing step S151 is a step of sensing an RPM variation of the storage body 41 after rotating the agitator 5 and the storage body 41 at a second RPM that is lower than the first RPM so as to keep the communication hole 42 closed. In addition, the judgment step S152 of judging whether or not the storage body 41 is in the unbalanced state is a step of sensing whether or not the storage body 41 is in the unbalanced state by comparing the measured RPM variation with the reference value.

The RPM variation of the storage body 41 and the agitator 5 may be measured using various methods. For example, a Hall sensor may be used to sense the magnetic force of a magnetic substance provided at a rotor of the drive unit 8.

In this case, the controller may determine the RPM variation by subtracting the minimum RPM from the maximum RPM of the storage body 41 based on a signal transmitted from the Hall sensor after rotating the storage body 41 and the agitator 5 at the second RPM for a given time via the drive unit 8.

Meanwhile, when the measured RPM variation is a predetermined reference value or less, the controller judges that the food waste stored in the storage body 41 is not in an eccentric state relative to the rotating shaft 47. However, when the measured RPM variation is greater than the predetermined reference value, the controller judges that the food waste is in an eccentric state relative to the rotating shaft 47.

When the food waste stored in the storage body 41 is not in an eccentric state relative to the rotating shaft 47, the controller directly performs a dehydration step S154 after the judgment step S152 ends. However, when the food waste stored in the storage body 41 is in an eccentric state relative to the rotating shaft 47, the controller performs a step S153 of performing at least one of a water supply step of supplying water to the housing body 31 and an agitation step of rotating the agitator 5, so as to remove unbalance of the storage body 41.

The agitation step is a step of rotating only the agitator 5 without rotating the storage body 41. During rotation of the agitator 5, the food waste is rearranged within the storage body 41, which enables effective unbalance removal.

However, it is important to perform the agitation step after controlling a position of the dehydrator 4 such that the communication hole 42 of the storage body 41 is located at a position for communication with the inlet port 33 of the housing body 31, in order to prevent the food waste within the storage body 41 from being discharged to the housing body 31.

That is, after completion of the judgment step S152, the agitation step may include controlling a position of the communication hole 42 that may be in the same manner as the first communication step S111, S112 and S113, rotating only the agitator 5, and controlling a position of the door blade 55 to close the communication hole 42 when rotation of the agitator 5 stops that may be in the same manner as the opening step S114 and S115.

The water supply step may be performed via the wash water ejector 28 and 29 included in the grinder 2 and may be performed via a separate supply pipe that connects the housing body 31 and an external water supply source to each other.

Water supplied to the housing body 31 via the water supply step may be introduced into the storage body 41 through the through-holes 43 of the storage body 41. Therefore, the water supplied to the housing body 31 causes the food waste to be rearranged within the storage body 41, which enables removal of the unbalanced state. Meanwhile, the above-described agitation step may be performed during implementation of the water supply step.

Although the above-described sensing step S151 has been described based on the case where a UB sensing step, or first sensing step, of sensing whether or not the storage body 41 is in the unbalanced state is performed, the sensing step S151 included in the control method may further include a load sensing step, or second sensing step of determining the amount of the food waste stored in the storage body 41 in addition to the above-described first sensing step.

Here, determining the amount of the food waste stored in the storage body 41 via the second sensing step serves to reduce a dehydration time by increasing the first RPM, which is set for the dehydration step S150, so as to be proportional to the amount of the food waste.

In addition, when the amount of the food waste is determined via the second sensing step, the dehydration time set for the dehydration step S150 may be increased in proportion to the amount of the food waste, which may result in complete dehydration of the food waste.

In addition, when the amount of the food waste is determined via the second sensing step, the output, e.g., heat emission, of the heater 735 may be increased in proportion to the amount of the food waste in the drying step S160 that will be described below, or an implementation time, e.g., drying time, of the drying step S160 may be increased in proportion to the amount of the food waste, which may result in reduced drying time and complete drying of the food waste.

Then, the second sensing step may be performed by measuring a time from a point in time when supply of power to the drive unit 8, which rotates the dehydrator 4 and the agitator 5 at the second RPM for implementation of the first sensing step stops for implementation of the first sensing step, to a point in time when rotation of the dehydrator 4 and the agitator 5 stops.

The amount of the food waste stored in the storage body 41 of the dehydrator 4 is proportional to a time required to stop rotation of the storage body 41 and the agitator 5 that are being rotated at the second RPM.

Accordingly, when the controller compares a time required to stop rotation of the storage body 41 that is being rotated at the second RPM after stopping the supply of power to the drive unit 8 with time data required to stop rotation of the storage body 41 that is being rotated at the second RPM according to the amount of food waste, the controller may determine the amount of the food waste stored in the storage body 41.

When the sensing step S151 includes the first sensing step and the second sensing step, in the control method, the first sensing step is followed by the second sensing step. When the sensing step S151 is completed as the second sensing step ends, at least one step S153 among the water supply step and the agitation step may be performed according to the results of the judgment step S152.

Meanwhile, upon judging that unbalance of the storage body 41 of the dehydrator 4 is removed, the control method proceeds to the dehydration step S154 and S155 of rotating both the storage body 41 and the agitator 5 together so that the communication hole 42 of the storage body 41 remains closed by the door blade 55 of the agitator 5.

Meanwhile, revolutions per minute, e.g., first RPM, and a reference dehydration time of the storage body 41, which are set for the dehydration step S154 and S155, may be set to fixed values regardless of the amount of the food waste stored in the storage body 41, or may be set to be increased in proportion to the amount of the food waste measured in the second sensing step as described above.

In the latter case, the controller may set dehydration time data corresponding to the amount of the food waste currently stored in the storage body 41, among a plurality of pieces of dehydration time data that may be stored in the controller or in a separate storage medium sorted according to the amount of food waste, to the reference dehydration time.

When the rotation time (dehydration time) of the storage body 41 and the agitator 5 reaches the reference dehydration time (S155), the control method proceeds to the drying step S160 of drying the food waste within the storage body 41.

The drying step S160, as illustrated in FIG. 19, may include a drying step S161 of drying the food waste and a determination step S162 of determining a drying time of the food waste.

Here, the drying step S161 may include only supplying hot air into the housing body 31 via the drier 73, or may further include rotating only the agitator 5, e.g., the drying agitation step, that is simultaneously performed with the supply of hot air.

In the case where the drying step S161 includes the drying agitation step, the control method may proceed to the drying step S161 after implementation of the step of controlling a position of the dehydrator 4 so that the communication hole 42 of the storage body 41 communicates with the inlet port 33 of the housing body 31.

This serves to prevent the food waste stored in the storage body 41 from leaking to the housing body 31 during implementation of the drying agitation step. That is, the drying agitation step includes controlling a position of the communication hole 42 that may be in the same manner as the first communication step S111, S112 and S113, rotating only the agitator 5, and controlling a position of the door blade 55 so as to close the communication hole 42 by the door blade 55 when rotation of the agitator 5 stops that may be in the same manner as the opening step S114 and S115.

Meanwhile, the drying agitation step may be continuously performed while hot air is supplied to the housing body 31 that may be for a reference drying time, and may be repeated plural times within the reference drying time.

The reference drying time, which is set for the drying step S162, may be preset to a fixed value regardless of the amount of the food waste, or may be set to be increased in proportion to the amount of the food waste measured in the second sensing step.

In the latter case, the controller may set drying time data corresponding to the amount of the food waste currently stored in the storage body 41, among a plurality of pieces of drying time data that may be stored in the controller or a separate storage medium and sorted according to the amount of food waste, to the reference drying time.

The above-described drying step ends when a time for which hot air is supplied to the food waste, or drying time, reaches the reference drying time (S162). When the drying step ends, the control method proceeds to the food waste discharge step S170 of discharging the food waste stored in the storage body 41 to the drawer 6.

The food waste discharge step S170, as illustrated in FIG. 20, may include a second communication step S171, S172 and S173 of communicating the communication hole 42 with the outlet port 35 of the housing 3 by rotating the dehydrator 4, an outlet port opening step S174 of opening the outlet port 35 by controlling the housing door 37, and a discharge step S175 and S176 of discharging the food waste from the storage body 41 by rotating only the agitator 5.

The second communication step includes rotating the agitator 5 and the dehydrator 4 together as the drive unit 8 rotates the agitator rotating shaft 53 in the first direction (S171) and stopping the rotation of the dehydrator 4 and the agitator 5 when the communication hole 42 of the dehydrator 4 reaches a position coinciding with the outlet port 35 of the housing 3 (S172 and S173).

Here, judgment of whether or not the communication hole 42 reaches the position for communication with the outlet port 35 (S172) is performed based on whether or not the second sensor 96 senses the magnetic force of the first magnetic substance 92.

Since the first magnetic substance 92 is fixed to the rotating shaft 47 of the dehydrator 4 so as to be located next to the communication hole 42 and the second sensor 96 is attached to the housing 3 so as to be located next to the outlet port 35, the controller may check that the communication hole 42 is located above the outlet port 35 when the second sensor 96 senses the magnetic force of the first magnetic substance 92.

Upon judging that the communication hole 42 is located above the outlet port 35, the controller stops operation of the drive unit 8 to stop rotation of the dehydrator 4 and the agitator 5 (S173).

Meanwhile, when the second communication step is completed, an outlet port opening step S174 of opening the outlet port 35 of the housing 3 by the housing door 37 is performed. Note that the outlet port opening step S174 may be performed before the second communication step S171, S172, and S173.

When the outlet port opening step S174 is completed, the controller performs discharge step S175 and S176 of rotating only the agitator 5 for a given time by changing the rotation direction of the drive unit 8 to the second direction.

When the discharge step S175 and S176 is performed for a predetermined time, the food waste inside the storage body 41 is discharged to the drawer 6 through the communication hole 42 and the outlet port 35 via rotation of the agitator 5. At this time, a positional relationship of the housing 3, the dehydrator 4 and the agitator 5 is as illustrated in FIG. 8(*c*). The control method may end simultaneously with completion of the discharge step S175 and S176.

Note that the control method may further include closing the communication hole 42 by the door blade 55 (S177 and S178) and closing the outlet port 35 by the housing door 37 (S179) after completion of the discharge step (S175 and S176).

In the case where the second position sensing unit includes only the second magnetic substance 95 and the third sensor 97, the communication hole closing step may include rotating the dehydrator 4 and the agitator 5 together until the first sensor 94 senses the magnetic force of the first magnetic substance 92, e.g., until the communication hole 42 reaches a position for communication with the inlet port 33, and rotating only the agitator 5 until, the third sensor 97 senses the magnetic force of the second magnetic substance 95.

However, in the case where the second position sensing unit further includes a fourth sensor (99, see FIG. 13) that is fixed to the housing body 31 and spaced apart from the third sensor 97 by 180 degrees, the communication hole closing step may include rotating only the agitator 5 until the fourth sensor 99 senses the magnetic force of the second magnetic substance 95 (S178, S179, and S180).

Since the second magnetic substance 95 and the third sensor 97 are located at positions where whether or not the door blade 55 has closed the communication hole 42 may be judged, in a state in which the fourth sensor 99 is spaced apart from the third sensor 97 by 180 degrees, the door 44 may be located above the outlet port 35 when the fourth sensor 99 senses the magnetic force of the second magnetic substance 95.

Accordingly, the communication hole 42, which is located to communicate with the outlet port 35 after completion of the discharge step S175 and S176, is closed by the door blade 55 when the fourth sensor 99 senses the magnetic force of the second magnetic substance 95.

Meanwhile, the closing of the outlet port 35 (S181) serves to allow water introduced into the housing 3 through the drain D in the sink S to move to the exhaust duct 71 through the second communication portion 313 other than the drawer 6.

The closing of the outlet port 35 (S181) may be performed simultaneously with or before the closing of the communication hole 42 by the door blade 55 (S178).

Subsequently, upon judging that the discharge of the food waste is completed, the residual food waste wash-off step S190 of washing off the residual food waste remaining in the housing body 31 of the housing 3, the storage body 41 of the dehydrator 4, and the door blade 55 and the agitation blade 57 of the agitator 5 is performed. The residual food waste wash-off step S190, as illustrated in FIG. 21, includes a wash water supply step S191, a wash-off step S192, an agitator rotation step S193, an opening alignment step S194, and a drainage step S195.

First, the housing door 37 provided at the bottom of the housing body 31 is closed prior to supplying wash water to the housing body 31. Here, in a state in which the housing door 37 has already been closed, the process of closing the housing door 37 may be omitted.

Subsequently, wash water for rinsing off the food waste is supplied to the housing body 31 (S191). The supply of wash water may be performed via the first nozzle 28 and the second nozzle 29 of the wash water ejector included in the grinder 2, or may be directly performed within the housing body 31 by a separate water supply aperture.

Meanwhile, upon completion of the supply of wash water, the wash-off step S192 of washing off the residual food waste remaining on the housing body 31, the dehydrator 4, and the agitator 5 is performed. Here, the wash-off step S192 may selectively include a process of rotating the agitator 5 and a process of simultaneously rotating the agitator 5 and the dehydrator 4.

First, in the case where the dehydrator 4 remains stationary and only the agitator 5 is rotated in the wash-off step S192, the agitator 5 is rotated at predetermined RPM for a predetermined time to separate food waste residues attached to the respective blades 55 and 57 of the agitator 5 and food waste residues remaining on the inner wall of the dehydrator 4.

Hereinafter, in the case where the agitator 5 and the dehydrator 4 are rotated simultaneously in the wash-off step S192, or a food waste rinsing step, the dehydrator 4 and the agitator 5 are rotated at predetermined RPM for a predetermined time to separate food waste residues attached to the inner wall of the housing body 31 and the inner wall of the dehydrator 4.

The rotation of the agitator 4 as well as the rotation of both the agitator 5 and the dehydrator 4 in the wash-off step S192 as described above may be selectively performed according to user setting, or may be alternately performed at a predetermined interval.

Thereafter, upon completion of washing of the housing body 31, the dehydrator 4 and the agitator 5, the controller performs a wash water drainage process of discharging the wash water. Here, prior to performing the wash water drainage step S195, it is necessary to align the communication hole 42 of the dehydrator 4 with the bottom of the housing body 31 (S193 and S194).

To align the communication hole 42 of the dehydrator 4 so as to face the bottom of the housing body 31, first, the controller rotates the dehydrator 4 (S193) and judges whether or not the communication hole 42 faces the bottom of the housing body 31 based on whether or not the second sensor 96 senses the magnetic force of the first magnetic substance 92 (S194). Thereafter, the wash water stored in the housing body 31 is drained as the discharge duct 71 is opened (S195). As such, the wash water used to wash the food waste residues in the housing body 31, the dehydrator 4 and the agitator 5 is discharged to the discharge duct 71 of the housing body 31 through the communication hole 42 of the dehydrator 4.

As is apparent from the above description, a food waste treatment apparatus may be capable of grinding and dehydrating food waste and a control method thereof.

In addition, a food waste treatment apparatus may employ a dryer and a drying method for removing a great quantity of moisture contained in ground food waste and a control method thereof.

In addition, a food waste treatment apparatus may include a rotating shaft intersecting a food introduction direction and a control method thereof.

In addition, a food waste treatment apparatus may be capable of removing highly viscous grounds or fine powder included in food waste before grinding of the food waste, achieving enhanced grinding efficiency, and a control method thereof.

In addition, a food waste treatment apparatus may be capable of washing off and discharging residual food waste remaining in a space in which food waste is ground after grinding and discharge of the food waste, and a control method thereof.

What is claimed is:

1. A control method of a food waste treatment apparatus, the control method comprising:

connecting a discharge side of a grinder with a communication hole of a dehydrator, the communication hole being configured to receive food waste from the grinder;

receiving, by the grinder, the food waste;

grinding the food waste;

receiving, by the dehydrator, the ground food waste;

supplying a predetermined amount of wash water to a housing that includes the dehydrator;

rinsing the ground food waste by moving wash water within the housing;

discharging wash water by rotating the dehydrator and, simultaneously, opening a discharge duct;

drying the ground food waste by rotating an agitator that is located in the dehydrator and, simultaneously, supplying dry air; and discharging the dried ground food waste by (i) connecting an outlet port of the housing with a communication portion of the dehydrator and (ii) rotating the agitator.

2. The control method according to claim 1, wherein supplying the predetermined amount of wash water to the housing includes supplying wash water through a first nozzle of the grinder or a second nozzle of the housing.

3. The control method according to claim 1, wherein rinsing the ground food waste includes simultaneously rotating the agitator and the dehydrator.

4. The control method according to claim 3, wherein the agitator includes a door blade configured to close the communication hole of the dehydrator.

5. The control method according to claim 1, wherein rinsing the ground food waste includes rotating the agitator and preventing the dehydrator from rotating.

6. The control method according to claim 1, wherein discharging wash water by rotating the dehydrator and, simultaneously, opening the discharge duct includes closing a door blade of the agitator by rotating the dehydrator and the agitator, wherein closing the door blade closes the communication hole of the dehydrator.

7. The control method according to claim 1, further comprising washing the housing and the dehydrator after discharging the dried ground food waste.

8. The control method according to claim 7, wherein washing the housing and the dehydrator includes:

supplying additional wash water into the housing;

washing the housing and the dehydrator by moving additional wash water; and draining additional wash water.

9. The control method according to claim 8, wherein supplying the additional wash water includes supplying additional wash water through a first nozzle of the grinder or a second nozzle of the housing.

10. The control method according to claim 8, wherein washing the housing and the dehydrator includes rotating the agitator and preventing the dehydrator from rotating.

11. The control method according to claim 10, wherein the communication hole of the dehydrator is connected with the outlet port of the housing.

12. The control method according to claim 11, wherein draining additional wash water includes rotating the agitator and, simultaneously, opening the discharge duct of the housing.

13. The control method according to claim 8, wherein washing the housing and the dehydrator includes simultaneously rotating both the agitator and the dehydrator.

14. The control method according to claim 13, wherein draining additional wash water includes (i) rotating the agitator and the dehydrator and (ii) simultaneously, opening the discharge duct of the housing.

* * * * *